W. BECK.
STATION INDICATOR.
APPLICATION FILED MAY 14, 1914.
1,152,139.
Patented Aug. 31, 1915.
5 SHEETS—SHEET 1.
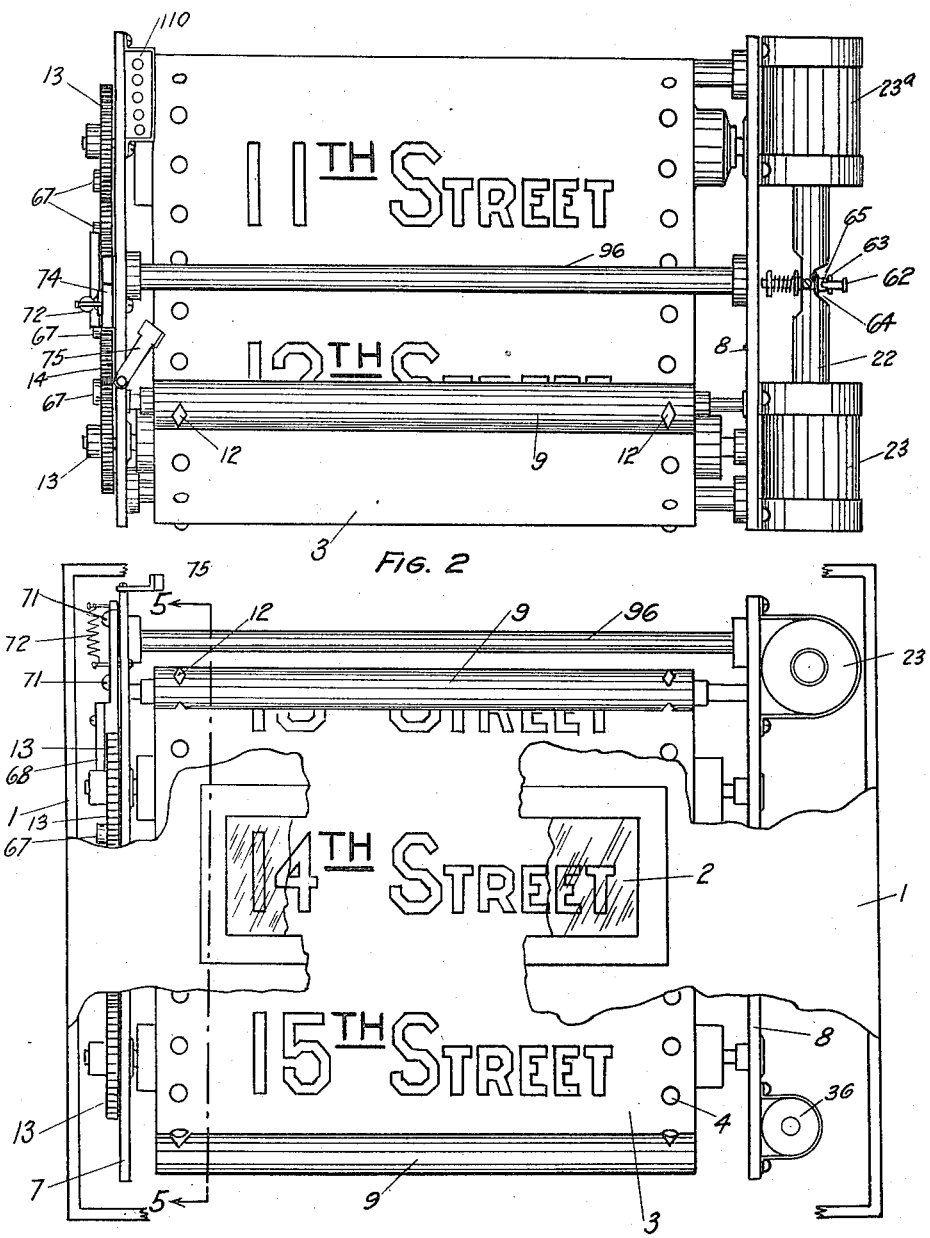
WITNESSES:
G. A. Lofland.
Nomie Welch.
INVENTOR
Washington Beck
BY
ATTORNEY

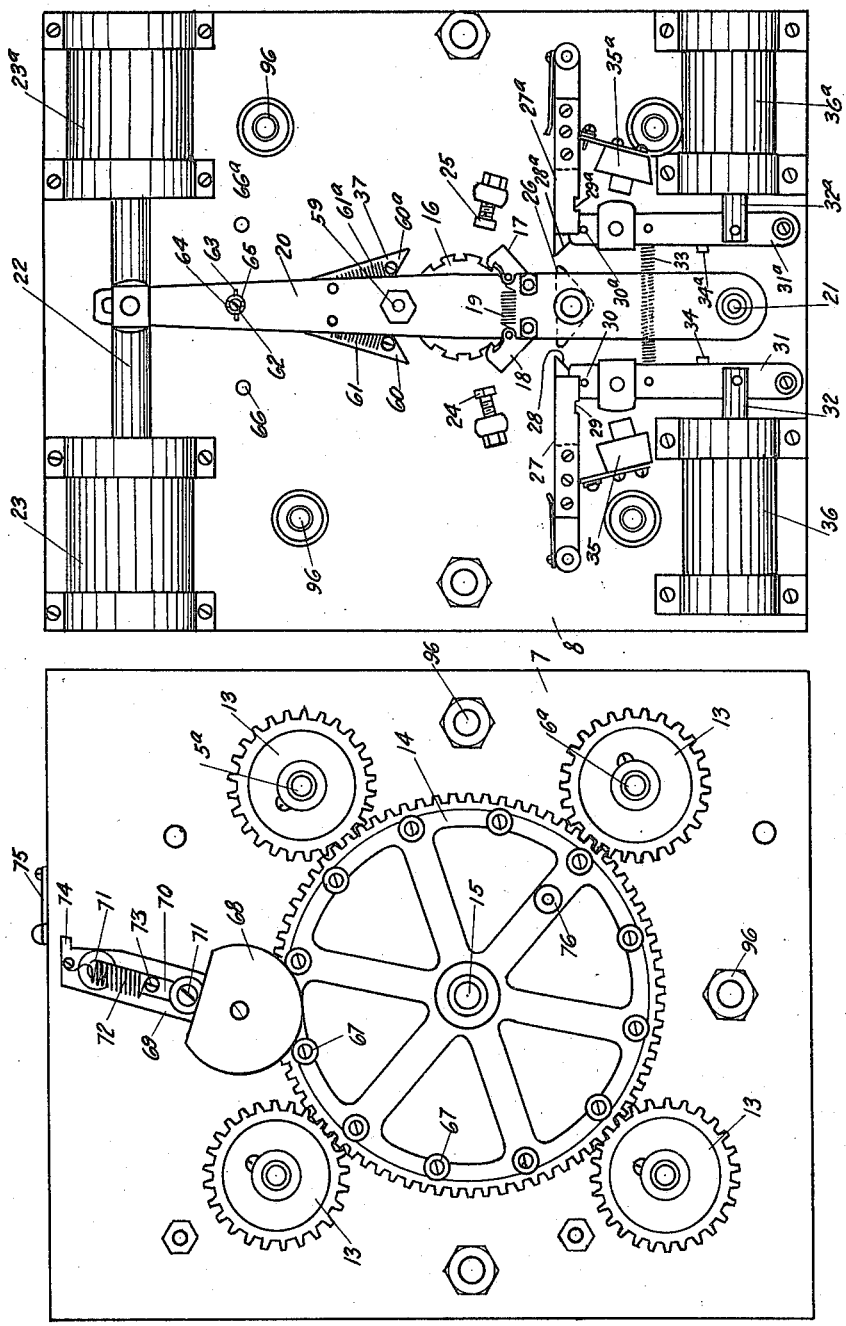

W. BECK.
STATION INDICATOR.
APPLICATION FILED MAY 14, 1914.

1,152,139.

Patented Aug. 31, 1915.
5 SHEETS—SHEET 3.

WITNESSES:
G. A. Lofland.
Nomie Nelah.

INVENTOR
Washington Beck.
BY
Rott Johnston
ATTORNEY

W. BECK.
STATION INDICATOR.
APPLICATION FILED MAY 14, 1914.

1,152,139.

Patented Aug. 31, 1915.
5 SHEETS—SHEET 4.

WITNESSES:

INVENTOR
Washington Beck
BY
ATTORNEY

W. BECK.
STATION INDICATOR.
APPLICATION FILED MAY 14, 1914.
1,152,139.
Patented Aug. 31, 1915.
5 SHEETS—SHEET 5.
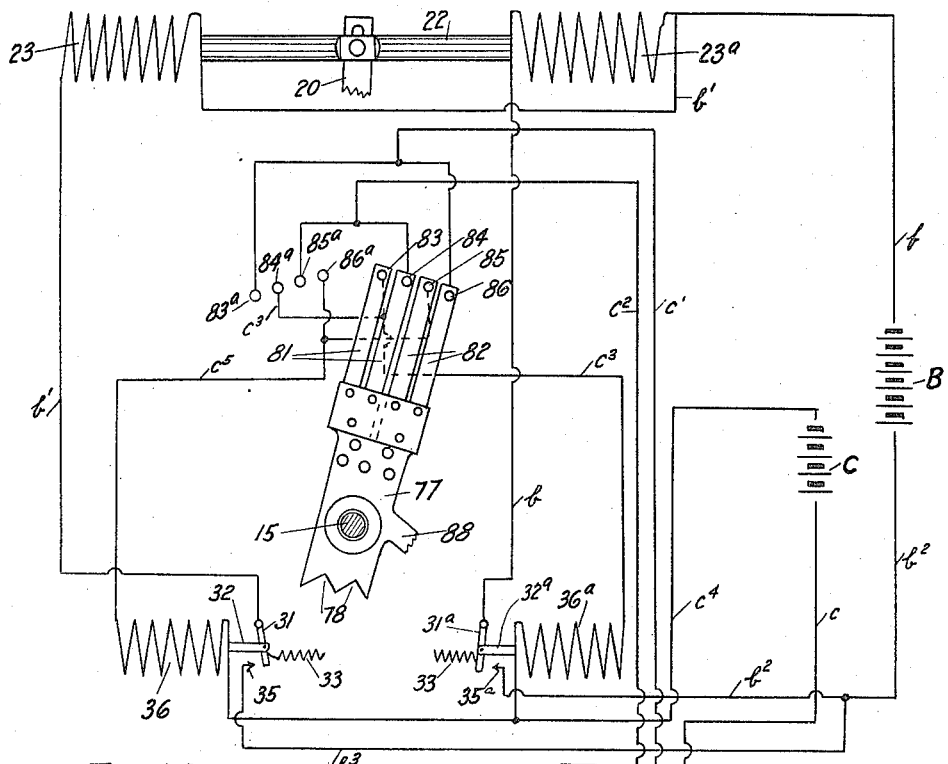
FIG. 10
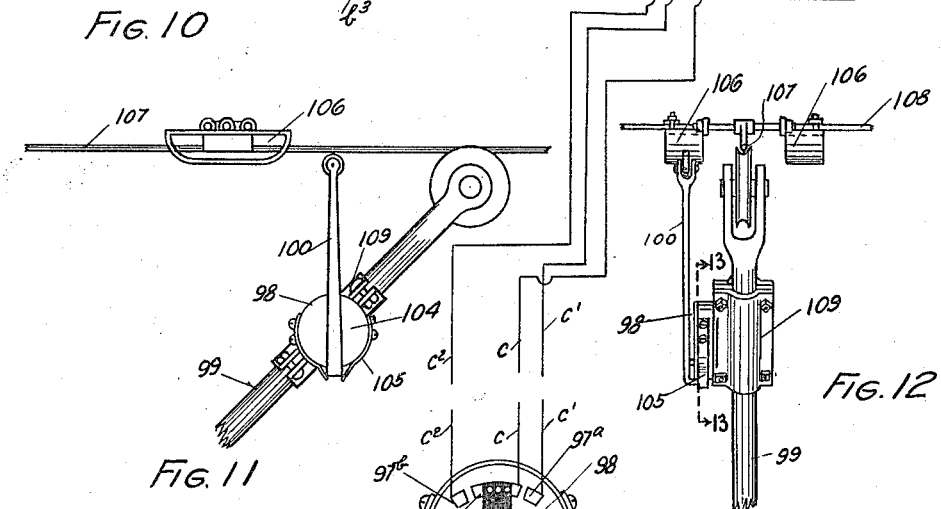
FIG. 11
FIG. 12
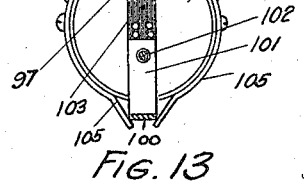
FIG. 13
WITNESSES:
G. A. Lofland.
Nomie Welsh.
INVENTOR
Washington Beck
BY
ATTORNEY

UNITED STATES PATENT OFFICE.

WASHINGTON BECK, OF ROCHESTER, NEW YORK, ASSIGNOR OF ONE-FOURTH TO CARL D. COKER, ONE-FOURTH TO ANDREW J. ALDRIDGE, AND ONE-FOURTH TO JOHN LEWIS, ALL OF BIRMINGHAM, ALABAMA.

STATION-INDICATOR.

1,152,139.   Specification of Letters Patent.   Patented Aug. 31, 1915.

Application filed May 14, 1914. Serial No. 838,606.

*To all whom it may concern:*

Be it known that I, WASHINGTON BECK, a citizen of the United States of America, residing at Rochester, in the county of Monroe and State of New York, have invented certain new and useful Improvements in Station-Indicators, of which the following is a specification.

My invention relates to improvements in station indicators and my object is to simplify and perfect an electrically controlled mechanism for actuating belts, whether endless or otherwise, upon which are displayed the names of the various streets, crossings or stations, so that they will be automatically displayed as signals to notify passengers as the car or train approaches such stations.

My invention comprises improvements in the mechanism for actuating the belt; in mechanism for reversing the direction of travel of the belt when the car is backed; in trip control mechanism to move the indicator in ample time to display the name of the station being approached; in mechanism controlled by the belt, when not of the endless type, to automatically reverse its direction of travel after it has been unwound; and in the various other novel details of construction and arrangements of parts which are hereinafter more fully described and claimed and which are illustrated in their preferred embodiment only in the accompanying drawings which form a part of this specification, and in which:—

Figure 5:
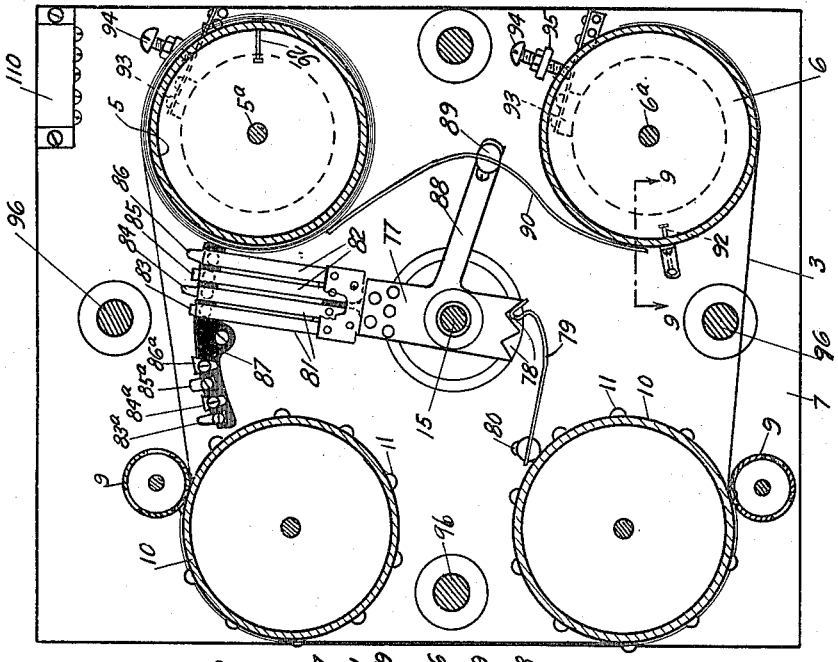
Figure 6:
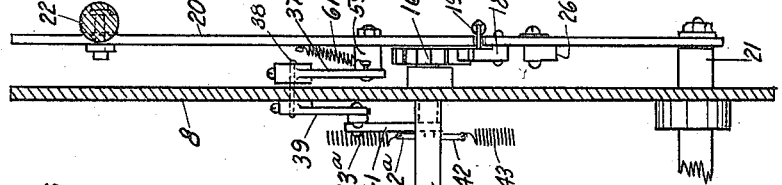
Figure 7:
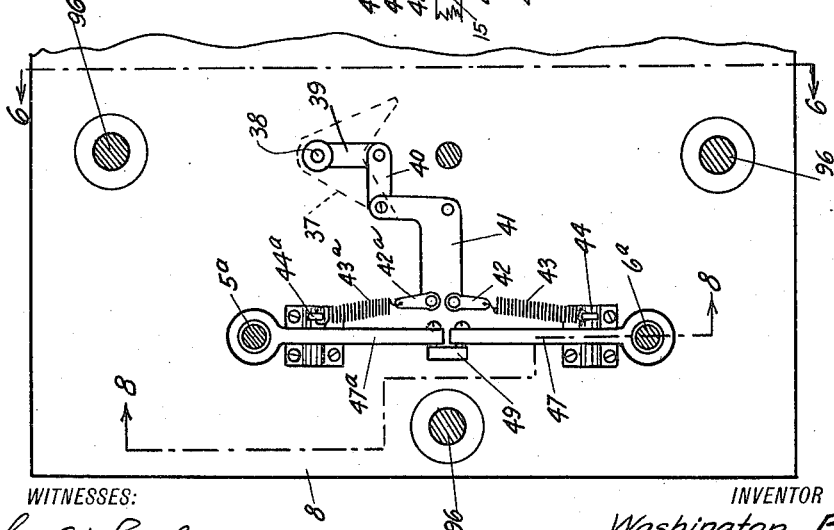
Figure 9:
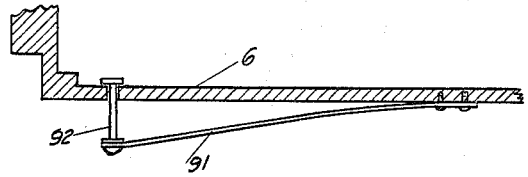
Figure 8:
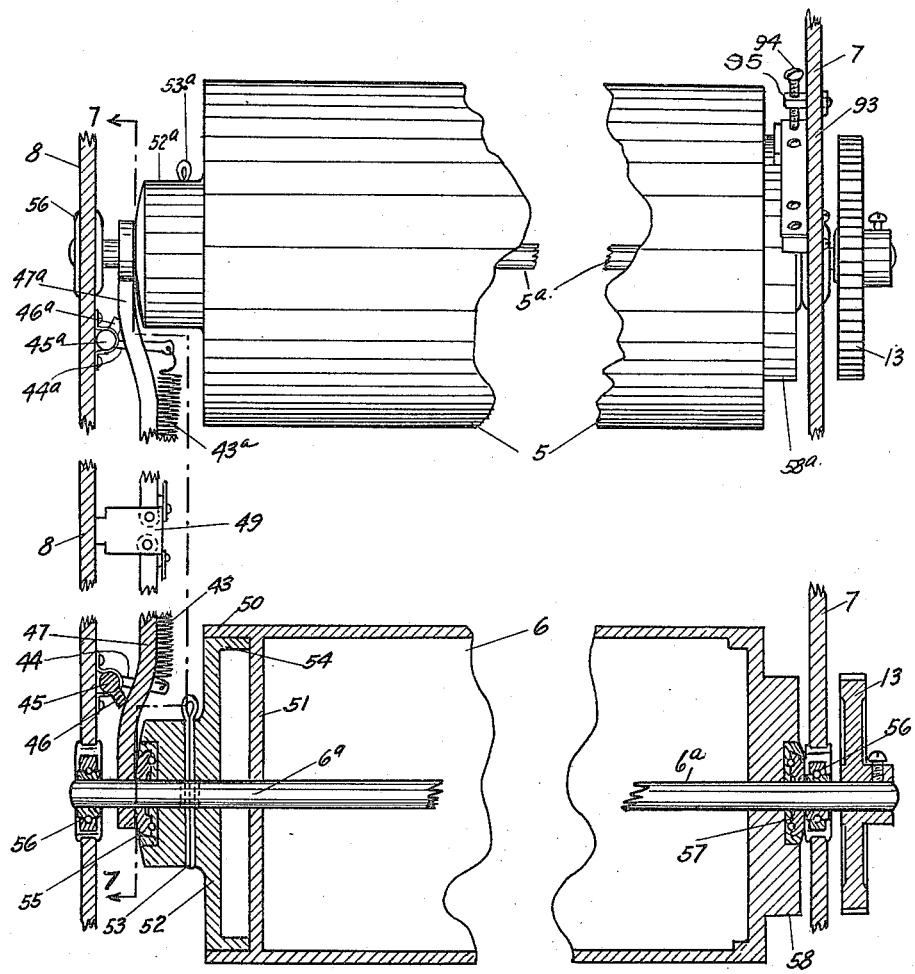

Figure 1 is a front elevation of the indicator showing the cabinet partly broken away. Fig. 2 is a top plan view of the operating mechanism removed from the cabinet. Figs. 3 and 4 are end elevations of Fig. 2 taken from opposite sides. Fig. 5 is a vertical cross section taken on the line 5—5 of Fig. 1. Fig. 6 is a vertical sectional view taken on the line 6—6 of Fig. 7. Fig. 7 is a vertical sectional view taken on the line 7—7 of Fig. 8. Fig. 8 is a sectional view taken on the line 8—8 of Fig. 7. Fig. 9 is a detail partial sectional view taken on the line 9—9 of Fig. 5. Fig. 10 is a diagrammatic view of the circuits. Figs. 11 and 12 are side and end views of the trolley and trip attachment for controlling the electric circuits. Fig. 13 is a sectional view taken on the line 13—13 of Fig. 12 with the cover plate removed.

Similar reference numerals refer to similar parts throughout the drawings.

My mechanism is mounted in a cabinet 1 having a glass panel 2 in its front exposed face through which is visible the street or station names which are displayed on a belt 3. This belt is provided along its margin with a series of equi-distantly spaced openings 4 and, as illustrated, is not of the endless type (though such may be used) being wound at its upper end on a roll 5 and at its lower end on a roll 6, both of which are disposed at the rear of the machine and journaled in the side plates 7 and 8 which support the operating mechanism and which are spaced from the side walls of the casing. The belt, as shown in Fig. 5, passes from the roll 6 forward of the machine between two pairs of rolls 9 and 10 to the roll 5, the rolls 10 having about their end studs 11 which engage in the holes 4 in the belt and the rolls 9 being preferably small tubular rolls with openings 12 at their ends disposed to receive the studs 11, thereby insuring the positive feed of the belt and holding it taut between the rolls 10 in display position.

The several rolls 5, 6 and 10 have their axes arranged to project through the side plates 7 and I mount fast on the outer end of each axis a spur gear 13, which gears are arranged to mesh with and be driven by a large centrally disposed gear 14 mounted on a shaft 15 which extends through both plates 7 and 8 and has a ratchet wheel 16 fast on its end adjacent to plate 8. This ratchet wheel 16 is provided with notches designed so that it can be rotated in either direction by the pawls 17 or 18 which are held against the ratchet wheel by a coiled spring 19 and are pivotally connected on opposite sides of a vertically disposed oscillatory lever 20 pivoted at its lower end to a stud bearing 21 on plate 8 and pivotally connected at its upper end to the reduced central portion of a rod 22 which serves as the core of oppositely disposed magnets 23 and 23ª, which are also attached to the plate 8. The rocking movement of the lever 20 in either direction is arrested by adjustable stops 24 and 25 on plate 8 and it has attached to its inner face a triangular shaped trip plate 26 with rounded corner edges adapted to engage, according to the direction of movement of the lever, one or the other of two spring pressed latches 27 and 27ª pivoted to plate 8 and provided at their forward ends with beveled faces 28 and 28ª and with bottom notches 29 and 29ª. These latches coöperate with pins 30 and 30ª at the upper end of switch arms 31 and 31ª that are pivoted at their lower ends to plate 8 and connected intermediate their ends to the magnet cores 32 and 32ª. A coil spring 33 holds these switch arms normally against the stops 34 and 34ª, and they carry knife edge switch blades adapted to engage pairs of contacts 35 and 35ª and close the circuits hereinafter described. The magnet cores 32 and 32ª are respectively controlled by magnets 36 and 36ª attached to the plate 8 and oppositely disposed. A rocking plate 37, having substantially an arrow-head construction, is connected rigidly at its upper end to a shaft 38, see Figs. 6 and 7, which extends through and journals in the plate 8 and has fast in its inner end a crank arm 39 connected by means of a link 40 to the upper end of a bell crank lever 41. This lever has oppositely disposed links 42, 42ª pivoted to its free end and connected by means of springs 43, 43ª with crank arms 44 and 44ª on rocker shafts 45 and 45ª suitably mounted on the inner face of the plate 8. These rocker shafts are provided respectively with studs 46 and 46ª which are adapted, respectively, to engage and force inwardly the arms 47 and 47ª. These arms are pivoted at their inner ends to a bearing 49 attached to plate 8 and at their free ends are slotted to receive the axes 5ª and 6ª of the rolls 5 and 6, respectively. The rolls 5 and 6 are free to turn on their axes and each has its left hand end (see Fig. 8) forming a collar 50 which projects beyond the end wall 51 of the roll. Clutch sleeves 52 and 52ª are respectively adjustably connected to the axes 5ª and 6ª by pins 53 and 53ª and are designed to have a close turning fit in ends 50 of the rolls. The inner end 54 of either clutch sleeve is adapted to engage the end wall 51 of its respective roll, its pin 53 or 53ª having play in the slot for it in the roll axis, when its respective arm 47 or 47ª is forced inwardly by the stud 46 or 46ª as the case may be. The clutch sleeves are each provided at their outer ends with an antifriction bearing ring 55 which is adapted to be engaged by the arms 47 or 47ª, as the case may be, the outer ends of the axes being supported in roller bearings 56 in the plates 7 and 8. An antifriction thrust bearing 57 is provided for the right hand ends of the rolls 5 and 6 which are provided with annular shoulders 58 and 58ª. The lever 20 carries a stud 59 which is disposed in its center and in position to engage the bottom beveled faces 60 and 60ª of the rocking plate 37, which plate is normally held in its central position relatively to the pin 59 by means of coiled springs 61 and 61ª which connect the lower ends of the plate with the lever and tend to draw the plate back to the position shown in Fig. 3. Near its upper end, if desired, the lever 20 may be provided with a spring pressed latch pin 62 adapted when a cross pin 63 therein is shifted into alinement with slots 64 in its guide sleeve 65 to permit its lower end to drop into either of the openings 66 or 66ª in the plate 8.

The large gear wheel 14 is provided with a series of equi-distantly spaced rollers 67 adapted to be engaged by a curved stop or set plate 68, see Fig. 4. This plate 68 is connected to the lower end of a slide plate 69 having therein a longitudinal guide slot 70 in which guide pins 71 work. These pins set the plate at a slight angle and it is normally held against the roller 67 by a coil spring 72 connected at its lower end to a pin 73 and at its upper end to the slide plate 69 which is also provided near its upper end with a detent 74 adapted to be engaged by a catch 75 pivoted to the top edge of plate 7 and serving to hold the plate 68 clear of the rollers 67 so that the gear 14 can be freely turned by a handle 76 thereon to reset the belt by hand.

On the shaft 15 adjacent to the inner side of the plate 7 I mount a switch arm 77 which is free to turn thereon having at its lower end two notches 78 in one or the other of which a set spring 79, connected to a stud 80, is adapted to engage so as to hold the switch arm in either operating position. At its upper end the arm carries two pairs of contact plates 81 and 82 which are suitably insulated from each other at their bases and which at their upper ends are adapted to engage one or the other of two sets of contacts 83, 84, 85, 86, and 83ª, 84ª, 85ª and 86ª, which are suitably mounted on an insulation base 87 connected to plate 7. The switch arm carries a lateral extension 88, which at its free end is provided with a stud 89. To this stud is fastened a curved spring plate 90, the ends of which are adapted to bear against the rolls 5 and 6, see Fig. 5. As shown in Fig. 9, each roll has connected to its face and disposed axially thereof a spring plate 91 adapted to normally spring away from the roll and being connected at its free end to a pin 92 which is passed through the roll and provided with a head on its inner end which limits the outward travel of the spring. These pins are so disposed that in their outer position they are adapted to engage the plate 90 and shift the switch arm 77, but it will be seen that the belt 3, as long as it is wound over the rolls will engage the plates and hold their pins in retracted position. When, however, as seen in Fig. 5, the belt has been unwound from roll 6, the pin 92 will then shift to the dotted position shown and, by engaging an end of plate 90, will shift the switch 77 into contact with the other set of contacts in the manner hereafter described, and will reverse the machine and thereupon the belt will travel in the reverse direction, serving to force the pin 92 back into the roll 6 so this will clear plate 90. When pin 92 of roll $5^a$ is released by the unwinding of the belt therefrom, it will strike the plate 90 and shift the switch 77 back to the position shown in Fig. 5, again reversing the machine.

I provide the rolls 5 and 6 with brake shoes 93 which engage the surfaces 58 and $58^a$ thereof, the tension of the brakes being controlled by set screws 94 which are screwed through studs 95 fast on the plate 7. The plates 7 and 8 are suitably braced together by cross bolts 96.

The method of wiring the apparatus for electrical control is illustrated diagrammatically in Fig. 10. The batteries B and C are shown as the sources of power, but any other source may be availed of. The main circuit for controlling main magnets 23 and $23^a$ is traced as follows; wire $b$ leads from one end of the battery B to magnet coil $23^a$ and a branch wire $b'$ leads to the coil 23. From magnet $23^a$ the wire $b$ continues to switch arm $31^a$ and when that is closed to the contacts $35^a$ by magnet $36^a$, the circuit is closed through wire $b^2$ back to the battery. In like manner the wire $b'$ leads from magnet 23 to switch arm 31 and is adapted to be closed by the latter through the wires $b^3$ and $b^2$ back to the battery. The circuits from the battery C can be traced as follows; wire $c$ leads from one pole of the battery to the central contact strip 97 in a controller box 98 connected to the trolley pole 99. The trip control mechanism on the trolley pole does not form a part of the subject matter of this particular application but is briefly described herein in order to make clear the operation of the apparatus as a whole. This box also carries on each side of the contact 97 two contacts $97^a$ and $97^b$. A trip arm 100 has its lower end bent inwardly and turned up at 101 to form a switch arm which passes upwardly through a notch into the box 98 where it is journaled on a pin 102. I attach to the switch arm 101 a circuit closing contact (not shown) which is suitably insulated at 103 from the switch itself. A cover plate 104 is provided for the box 98 and to the sides of this are connected oppositely acting springs 105 between which the lower end of the trip arm 100 is disposed, and by means of which it is held normally in vertical or neutral position, as shown in Figs. 11 and 13. When the trip arm 100 strikes the trip plate 106 on the strand wire 108 which supports the trolley wire 107, it will be rocked rearwardly, thereby moving its switch arm 101 to close the circuit between the contacts 97 and $97^a$ so that current will flow through wire $c'$ to the contacts $83^a$ and 86. If switch 101 is moved in the reverse direction, it will open circuit wire $c'$ and close the circuit to wire $c^2$ and to the contacts $85^a$ and 84. The contacts $84^a$ and 83 are connected to wire $c^3$ which includes the coil $36^a$ and is connected by return wire $c^4$ to the battery C. The contacts 85 and $86^a$ are connected by wire $c^5$ which includes the magnet 36 and returns through wire $c^4$ to the battery.

When the switch arm 77 is in the position shown in Fig. 10, if arm 101 is moved to close the circuit through wire $c'$, current will flow to contact 86, plates 82, contact 85 to wire $c^5$ and energize the magnet 36, thereby closing the switch in wire $b'$ at 35 and causing battery B to energize magnet 23 and jerk the lever 20 to the left. In like manner, when contact arm 77 is shifted to its position over the other set of contacts $83^a$, and arm 101 is moved to close the circuit to wire $c^2$, the same operation will result. If however the arm closes the circuit through wire $c'$, current will flow through contact $83^a$, plates 81 and wire $c^3$ to energize the magnets $36^a$ and $23^a$ and shift the lever 20 to the right, which same result would follow if arm 101 were shifted to the left when the parts are in the position shown in Fig. 10. When shifted to the right the lever 20 places under tension the spring 61 and also spring $43^a$ through the rocking of the plate 37 and the mechanism connected therewith, as shown in Fig. 7. This movement causes the dog 18 to advance the ratchet wheel 16 counter-clockwise, which advances the gear wheel 14, as viewed in Fig. 4, in a clockwise direction and rotates the several feed rolls counter-clockwise. The pull on spring $43^a$ moves the clutch sleeve $52^a$ into service and causes the roll 5 to rotate and wind the belt on it, advancing the belt one position, while the clutch sleeve of roll 6 leaves the latter free to feed off the belt. This rotation of the ratchet 16 turns shaft 15 and gear 14 sufficiently to cause one roller 67 to ride under the plate 68, which latter then drops down between the succeeding pair of rollers and serves to stop and center the belt actuating mechanism in position to display the station name.

When lever arm 20 is shifted to the left, the ratchet 16 and shaft 15 are turned to reverse and through spring 43 and arm 47, the clutch 52 is thrown into service and roll 6 is turned to wind the belt thereon while the roll 5 is left free to turn and feed off the belt. When switch arm 31 is drawn inwardly by its magnet 36, its pin 30 drops into the notch 29 of the spring catch 27 and is held in this position with the circuit 35 positively closed until the magnet 23 has acted to draw the lever arm 20 its full stroke to the left, whereupon the trip plate $26^a$ strikes the beveled end 28 of the plate 27 and raises it, thereby freeing the switch arm from the catch and permitting spring 33 to draw it into open position. The same operation applies to the switch arm 31ª.

In the manner already explained, when either pin 92 is shifted outwardly by the removal of belt tension from its spring 91, it will strike the plate 90 and shift the switch arm 77 to reverse its position and accordingly the direction of operation of the machine will reverse the travel of the belt. Where endless belts are used this provision can be dispensed with. The trolley trips 106 are attached to the cross strands 108 and disposed on each side of the trolley wire 107. They are beveled at each end so that if a car happens to be backed past one of these contacts, switch 101 will close the circuit to wire $c^2$ which will cause the machine to reverse one step and therefore the belt will not lose its correct position when the car again goes forward and trip arm 100 is again actuated by the same trip. The box 98 is connected near the end of the trolley arm by clamp 109 and the circuit wires $c$, and $c'$ and $c^2$ are led to the car in any suitable manner. As shown in Fig. 5 the several wires enter the indicator through a multiple socket plug 110. The several wires in the box lead from connecting screws at the base of the plug to the magnets and switch points in the manner described.

Without intending to limit myself to the particular details of construction and arrangement of parts hereinabove described, but regarding the same merely as my preferred construction, what I claim as new and desire to secure by Letters Patent, is:—

1. In a station indicator, the combination with means to display in succession a series of station names, of reversible actuating mechanism for said means, said mechanism comprising an oscillatory lever, a ratchet wheel, oppositely acting dogs on said lever for advancing said wheel in either direction, magnets for operating said lever in either direction, magnet circuits, an electrically controlled switch for each magnet circuit, trip controlled means to electrically close either of said switches, a latch to hold each switch closed and the magnet controlled thereby energized until it has fully moved the lever, said latch being adapted to be released by the lever at the extreme of its travel, and means to automatically open the switches when their respective catches are released.

2. In a station indicator, a belt having displayed thereon the station names, mechanism for feeding the belt a step at the time, said mechanism comprising an oscillatory lever, electrically controlled means to move said lever from a neutral position in either direction, a double acting pawl and ratchet driven transmission mechanism operated by said lever and adapted to impart movement to the belt in either direction, a rocking member movable with the lever, normally open friction clutches interposed in said driving mechanism, and means controlled by said rocking member according to its direction of movement which causes one or the other of said clutches to engage and drive said belt in one or the other direction, substantially as described.

3. In a station indicator, a belt having displayed thereon station names, mechanism for advancing the belt step by step comprising rolls which feed and guide the belt, and means for reversing the direction of movement of the belt actuating mechanism, which means comprise spring pressed actuators which spring outwardly when free of the belt, a rocking reversing lever, springs thereon which frictionally engage the belt wound on the rolls and are disposed in position to be engaged by a released actuator and moved thereby to shift said lever, and means controlled by said lever to reverse said feed mechanism for the belt.

4. In a station indicator, the combination with movable means for displaying station names, of mechanism for advancing said means step by step in either direction, said mechanism comprising an oscillatory actuating lever, motion transmission means operable by said lever and adapted to advance said movable display means, solenoids disposed on opposite sides of said lever and having a common core connected to said lever, and trip controlled mechanism which energizes one or the other of said solenoids according to the direction in which it is tripped.

5. In a station indicator, the combination with a movable belt having displayed thereon station names, and feed rolls which control the movement of said belt, of mechanism for advancing the belt comprising an oscillatory member, a main drive shaft, means to transmit rotary motion in either direction from said member to said shaft, a friction drive member for each feed roll, gears driven from said shaft to rotate said friction members responsive to the movement of said member, and means actuated by said oscillatory member to force one or the other of said friction means into operative engagement with its respective feed roll, while leaving the other roll free to rotate.

6. In a station indicator, in combination, an oscillatory lever, a large gear wheel, a double acting pawl and ratchet driving connection between said lever and gear whereby the latter is moved in one or the other direction step by step, a spring pressed forked rocking plate, a projection on the lever interposed between the forked ends of said plate and adapted to be engaged thereby and adjusted to hold the lever normally in neutral position, electrically controlled means to actuate the lever in either direction, a display belt, feed rolls for the belt, clutch members for driving said feed rolls, which members are driven by gears meshing with said large gear, and means operated by said rocking plate to control the engagement of only one of said clutches at a time with its respective feed roll, substantially as described.

7. In a station indicator, display mechanism having station names thereon and adapted to be actuated step by step to display the same, means to actuate said display mechanism comprising a rocking drive lever, spring means to hold it in neutral position, magnetic means to rock said lever in opposite directions, two friction clutches adapted to be driven in reverse directions by said lever and adapted to impart motion to said display mechanism, means controlled by the direction of movement of said lever to cause one or the other of said clutches to drive said display mechanism, substantially as described.

8. In a station indicator, an oscillatory actuating lever, spring means holding it normally in neutral position, trip controlled electro-magnetic mechanism for oscillating it in either direction from said neutral position, a station indicating belt, feed rolls for said belt, driving connections to said feed rolls comprising friction clutches, a double acting pawl and ratchet driving connection between said lever and said clutches which are adapted to be driven thereby in either direction, said clutches being normally open, and spring means actuated by the lever to throw one or the other of said clutches into service according to the direction of travel of the lever.

9. In a station indicator, the combination with a display mechanism and reversible driving means therefor, of actuating mechanism for operating said driving means comprising an oscillatory lever, spring means to hold the lever in neutral position, electrically controlled means to shift the lever in either direction from its neutral position, said means comprising lever actuating magnets, switch and circuit connections controlling the energization of each of said magnets, a control magnet for controlling each of said switches, a reversible switch and circuits controlled thereby for energizing one or the other of said latter magnets to close its respective control switch and effect the energization of its respective lever actuating magnet, and means to hold said control switch closed until the lever actuating magnet completes its actuating movement.

10. In a station indicator, an electrically operated reversible step by step driving mechanism for the name display means comprising separate power circuits and normally open switches in said circuits, of control mechanism for said switches comprising normally open circuits, magnetic means in each circuit to control one of said switches, stationary trips and switch means actuated thereby for closing one or the other of said control circuits momentarily to close the power circuit switch controlled thereby, means to hold said power circuit switch closed during the resultant movement of the operating mechanism to shift the display means one step, and means to effect the opening of said power circuit switch at the completion of the actuating movement, substantially as described.

11. In a station indicator, an electro-mechanical mechanism comprising an electric motor, a crank, and transmission means operable by the crank for effecting a step by step feed of a display means, a power circuit for said electric motor, a switch therein, means tending to hold said switch normally open, a control circuit including magnetic means to close said switch, a switch to momentarily energize said control circuit and close said power circuit switch, catch means to engage and hold said power circuit switch closed, and a trip moved by the crank to release the catch means at the end of the crank's travel and permit said power circuit switch to open, substantially as described.

In testimony whereof I affix my signature in presence of two witnesses.

WASHINGTON BECK.

Witnesses:
F. M. YECKLEY,
MYRON J. HAYES.

Copies of this patent may be obtained for five cents each, by addressing the "Commissioner of Patents, Washington, D. C."